(12) United States Patent
Jeihani et al.

(10) Patent No.: US 12,145,597 B2
(45) Date of Patent: Nov. 19, 2024

(54) SYSTEM AND METHOD FOR DRIVER DISTRACTION DETECTION AND CLASSIFICATION

(71) Applicant: Morgan State University, Baltimore, MD (US)

(72) Inventors: Mansoureh Jeihani, Timonium, MD (US); Samira Ahangari, Baltimore, MD (US); Abdollah Dehzangi, Baltimore, MD (US); Arsalan Hassan Pour, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 565 days.

(21) Appl. No.: 17/389,741

(22) Filed: Jul. 30, 2021

(65) Prior Publication Data
US 2022/0032924 A1 Feb. 3, 2022

Related U.S. Application Data

(60) Provisional application No. 63/058,592, filed on Jul. 30, 2020.

(51) Int. Cl.
*B60W 40/09* (2012.01)
*B60W 40/02* (2006.01)
(Continued)

(52) U.S. Cl.
CPC ............ *B60W 40/09* (2013.01); *B60W 40/02* (2013.01); *B60W 50/14* (2013.01); *G06F 18/24* (2023.01);
(Continued)

(58) Field of Classification Search
CPC ............ B60W 40/09; B60W 2540/229; G60V 20/597
See application file for complete search history.

(56) References Cited

U.S. PATENT DOCUMENTS

| | | | | |
|---|---|---|---|---|
| 2004/0252027 | A1* | 12/2004 | Torkkola | G08B 21/06 340/576 |
| 2018/0126901 | A1* | 5/2018 | Levkova | B60W 40/09 |

\* cited by examiner

*Primary Examiner* — Imran K Mustafa
(74) *Attorney, Agent, or Firm* — Whiteford, Taylor & Preston, LLP; Gregory M. Stone

(57) ABSTRACT

Systems and methods are disclosed for detecting both the occurrence and type of driver distraction experienced by a driver, determined through evaluation of sensed vehicle conditions or activities, such as steering, braking, lane changing, etc. as detected by one or more sensors on or associated with the vehicle. That detection of the occurrence and type of driver distraction may then be used to initiate another action, including initiating an audible or visual alert to the driver, taking measures to interfere with or stop operation of the device that is causing the distraction, log the occurrence and type of distraction that occurred, and report the occurrence and type of distraction to an outside monitoring computer (such as one associated with a guardian of the driver, an insurer of the vehicle, a law enforcement authority, or the like). To allow such detection, the system and method set forth herein employ machine learning methods to first train a classifier to classify certain driver behaviors (as evidenced by sensed vehicle movements and conditions) as a distraction or non-distraction event, and if a distraction event is detected then to further classify a type of such distraction event, and then to apply the trained classifier to classify the driver's ongoing driving activity.

20 Claims, 3 Drawing Sheets

(51) Int. Cl.
  *B60W 50/14* (2020.01)
  *G06F 18/24* (2023.01)
  *G06N 20/00* (2019.01)
  *G06V 20/59* (2022.01)
(52) U.S. Cl.
  CPC ........... *G06N 20/00* (2019.01); *G06V 20/597*
    (2022.01); *B60W 2050/143* (2013.01); *B60W*
      *2050/146* (2013.01); *B60W 2540/229*
      (2020.02); *B60W 2540/30* (2013.01); *B60W*
    *2552/00* (2020.02); *B60W 2756/10* (2020.02)

SYSTEM AND METHOD FOR DRIVER DISTRACTION DETECTION AND CLASSIFICATION

CROSS REFERENCE TO RELATED APPLICATIONS

This application is based upon and claims the benefit of U.S. Provisional Application No. 63/058,592 titled "Distracted Driving Recognition Model Using Learning Machine," filed with the United States Patent & Trademark Office on Jul. 30, 2020, the specification of which is incorporated herein by reference in its entirety.

GOVERNMENT LICENSE RIGHTS

This invention was made with government support under DTRT13-G-UTC33 awarded by the U.S. Department of Transportation. The government has certain rights in the invention.

FIELD OF THE INVENTION

This invention relates generally to systems and methods for safety monitoring of drivers, and more particularly to systems and methods for automatically detecting and classifying driver distraction behavior based on at least sensed vehicle activity.

BACKGROUND OF THE INVENTION

Distracted driving is known to be one of the core contributors to crashes in the U.S., accounting for about 40% of all crashes. Drivers' situational awareness, decision-making, and driving performance may become impaired due to temporarily diverting their attention from the primary task of driving to other unrelated tasks. In general, distracted driving may be defined as diverting a driver's attention from driving to other behaviors, tasks, or situations that lessen the driver's ability to sustain awareness and be in complete control of the vehicle. Distracted driving may have different causes such as eating, drinking, manipulating dashboard controls, visual deviations such as looking at a smartphone screen, or cognitive activities such as talking on the phone that divert the driver's attention away from driving. Some activities such as texting can include many different types of distractions, e.g., physical, visual, and cognitive distractions. Distracted driving is a safety threat as it takes drivers' eyes off of the road, their hands off of the steering wheel, and their thoughts elsewhere, which increases the probability of crashes and fatalities.

Efforts have been made to address the risks associated with driver distraction, such as those caused by in-vehicle technologies and smartphones. Although in-vehicle systems such as adaptive cruise control systems and navigation have been provided in an effort to advance safety and convenience, a driver's use of such in-vehicle systems occasionally diverts a driver's attention away from the main driving tasks. For example, talking on the phone while driving may be considered a distracting behavior, even with hands-free systems. When talking on the phone, the driver's attention is diverted from the driving task to the conversation, which may diminish driving performance. Over time and with improvements in technology, new forms of distraction including voice command text and personalized phone-based digital assistance may emerge as well and add to further driver distraction.

Due to ever-increasing sources of driving distractions in the technology age and the inherent human error in driving tasks, abolishing driving distraction altogether is not a likely outcome. Instead, before the full adoption of driverless vehicles, an interim objective may be to identify the distraction, and based on the specific type of distraction, take appropriately tailored action to warn drivers to stay focused while driving. To do so requires the development of a built-in system that can identify driving distractions based on driving behavior, e.g., speed variation, sudden braking, lateral displacement, etc. to identify the type of distraction, and in turn take action appropriate for that particular type of distraction to warn the driver and/or otherwise minimize the danger created by the particular distraction. Knowledge of the type of distraction that a driver is experiencing may be particularly important as differing types of distracted driving contain a combination of manual, visual, auditory, and cognitive components, each of which can have a negative impact on the driver's ability to keep lane position, constant speed, and their eyes on the road, and each of which may be addressed by differing countermeasures. Unfortunately, prior efforts in this field have generally not provided distraction prediction models that might be employed to classify the occurrence and type of a distraction type on driving performance and, in turn, take appropriate warning alert or other protective countermeasures.

Thus, there remains a need in the art for automated systems and methods for predicting driver distraction based on a driver's behavior to, in turn, provide the most effective countermeasures for a particular distraction.

SUMMARY OF THE INVENTION

Disclosed herein are computer-implemented systems and methods for detecting and classifying a type of driver distraction based upon sensed vehicle activity or condition, and preferably additionally on road and traffic class and condition. In accordance with certain aspects of an embodiment of the invention, the classification of the occurrence and type of driver distraction may then be used to determine a countermeasure to be employed by the vehicle (such as creating a visual or audio alert, blocking cell phone signals, or such other countermeasures as may occur to those skilled in the art), record in local or remote memory the occurrence of such driver distraction, and optionally alert one or more third party monitoring computers of the occurrence of such driver distraction, as discussed in greater detail below.

In accordance with certain aspects of an embodiment of the invention, a machine learning process is employed to develop a classification module capable of classifying various driving activities, such as by way of non-limiting example speed variation, sudden braking, vehicle lateral displacement, and the like for the current road class on which the vehicle is travelling, and optionally the current traffic conditions surrounding the vehicle, as different types of driver distractions.

In accordance with certain aspects of an embodiment of the invention, a system is provided for detecting and classifying a type of driver distraction, comprising a driving simulator data capture device configured to acquire simulated driving behavior data profiles associated with a plurality of driving simulations in which a driving simulation operator engages a known driving distraction at a known time or simulated location during the driving simulation, a distraction classification training device receiving the simulated driving behavior data from the driving simulator data capture device, a distraction occurrence and type determination device, and a computer readable memory in data communication with the distraction classification training device and the distraction occurrence and type determination device. The distraction classification training device includes a training processor executing computer instructions configured to determine at the training processor a classification of each simulated driving behavior data profile as one of a driving distraction event or driving non-distraction event, upon classification of a first simulated driving behavior data profile as a driving distraction event, classify a type of distraction event for the first simulated driving behavior data profile, and store the classifications of each simulated driving behavior data profile and one or more classifications of types of distraction events in the computer readable memory. The distraction classification training device includes an application processor executing computer instructions configured to receive at the distraction classification training device from a remote vehicle sensor system a live driving behavior data profile associated with the remote vehicle sensor system, compare the live driving behavior data profile to the classifications in the computer readable memory, determine at the application processor a classification of the live driving behavior data profile as one of a live driving distraction event or a live driving non-distraction event, and upon classification of the live driving behavior data profile as a live driving distraction event, classify a type of distraction event for the live driving behavior data profile.

In accordance with further aspects of an embodiment of the invention, a method is provided for detecting and classifying a type of driver distraction, comprising acquiring simulated driving behavior data profiles from a driving simulator data capture device, wherein each driving behavior data profile is associated with a driving simulation in which a driving simulation operator engages a known driving distraction at a known time or simulated location during the driving simulation, receiving at a distraction classification training device the simulated driving behavior data from the driving simulator data capture device, determining at the distraction classification training device a classification of each simulated driving behavior data profile as one of a driving distraction event or driving non-distraction event, upon classification of a first simulated driving behavior data profile as a driving distraction event, classifying at the distraction classification training device a type of distraction event for the first simulated driving behavior data profile, and storing classifications of each simulated driving behavior data profile and one or more classifications of types of distraction events in a computer readable memory in data communication with the distraction classification training device. The method further comprises receiving at a distraction occurrence and type determination device from a remote vehicle sensor system a live driving behavior data profile associated with the remote vehicle sensor system, wherein the distraction occurrence and type determination device is in data communication with the computer readable memory, comparing at the distraction occurrence and type determination device the live driving behavior data profile to the classifications in the computer readable memory, determining at the distraction occurrence and type determination device a classification of the live driving behavior data profile as one of a live driving distraction event or a live driving non-distraction event, and upon classification of the live driving behavior data profile as a live driving distraction event, classifying at the distraction occurrence and type determination device a type of distraction event for the live driving behavior data profile.

In accordance with still further aspects of an embodiment of the invention, a non-transitory computer-usable medium for detecting and classifying a type of driver distraction is provided, the computer-usable medium embodying a computer program code, the computer program code comprising computer executable instructions configured for acquiring simulated driving behavior data profiles from a driving simulator data capture device, wherein each driving behavior data profile is associated with a driving simulation in which a driving simulation operator engages a known driving distraction at a known time or simulated location during the driving simulation, receiving at a distraction classification training device the simulated driving behavior data from the driving simulator data capture device, determining at the distraction classification training device a classification of each simulated driving behavior data profile as one of a driving distraction event or driving non-distraction event; upon classification of a first simulated driving behavior data profile as a driving distraction event, classifying at the distraction classification training device a type of distraction event for the first simulated driving behavior data profile; and storing the classifications of each simulated driving behavior data profile and one or more classifications of types of distraction events in a computer readable memory in data communication with the distraction classification training device. The computer program code further comprises computer executable instructions configured for receiving at a distraction occurrence and type determination device from a remote vehicle sensor system a live driving behavior data profile associated with the remote vehicle sensor system, wherein the distraction occurrence and type determination device is in data communication with the computer readable memory, comparing at the distraction occurrence and type determination device the live driving behavior data profile to the classifications in the computer readable memory, determining at the distraction occurrence and type determination device a classification of the live driving behavior data profile as one of a live driving distraction event or a live driving non-distraction event, and upon classification of the live driving behavior data profile as a live driving distraction event, classifying at the distraction occurrence and type determination device a type of distraction event for the live driving behavior data profile.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION

Figure 1:
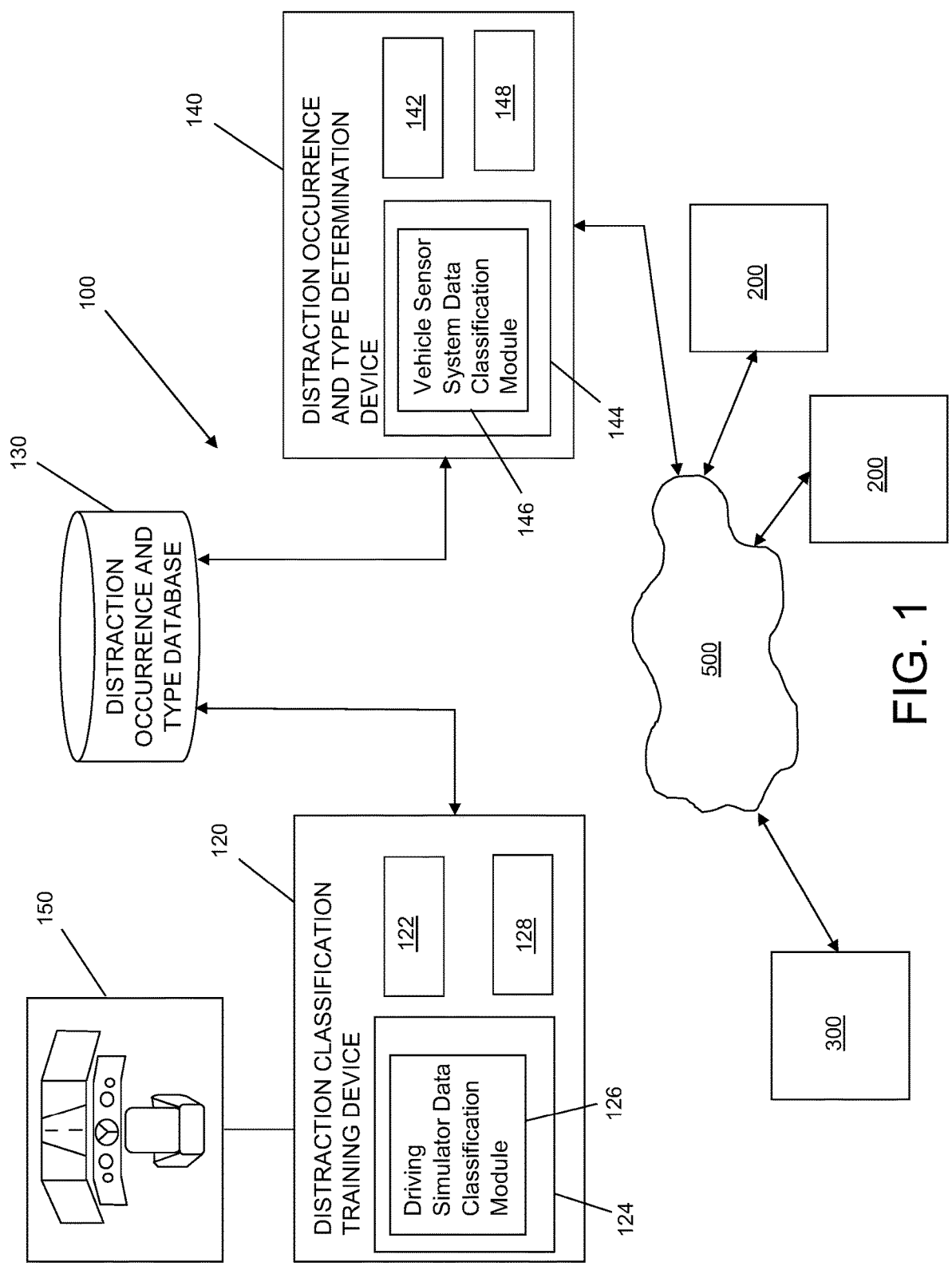
FIG. 1 is a schematic view of a system for detecting and classifying a type of driver distraction according to certain aspects of an embodiment of the invention.

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

By way of summary, systems and methods configured in accordance with certain aspects of the invention detect both the occurrence and type of driver distraction experienced by a driver, determined through evaluation of sensed vehicle conditions or activities, such as steering, braking, lane changing, etc. as detected by one or more sensors on or associated with the vehicle. That detection of the occurrence and type of driver distraction may then be used to initiate another action, including by way of non-limiting example initiating an audible or visual alert to the driver, taking measures to interfere with or stop operation of the device that is causing the distraction, log the occurrence (and preferably type) of distraction that occurred, report the occurrence (and preferably type) of distraction to an outside monitoring computer (such as one associated with a guardian of the driver, an insurer of the vehicle, a law enforcement authority, or the like), and/or such other responsive actions as may occur to those skilled in the art. To allow such detection, the system and method according to certain aspects of the invention employ machine learning to first train a classifier to classify certain driver behaviors (as evidenced by sensed vehicle movements and conditions) as a distraction or non-distraction event, and if a distraction event a type of distraction event, and then to apply the trained classifier to classify to driver's ongoing live driving activity.

In general the initial process of employing machine learning to train a classifier to classify certain driver behaviors includes acquiring data from a data source, such as a driving simulator, including data indicative of vehicle actions (e.g., lane changes, vehicle speed, braking, throttle usage, and steering), and preferably data indicative of the road type and condition (e.g., road size/number of lanes, speed limit, traffic load, etc., and preferably including at least one or more of each of rural connectors, freeways, urban arterials, and local roads, such as local roads in a school zone), along with identification of a known type of distraction presented to the driver at a known location and time during the driving simulation. After acquiring such data, the system trains a distraction occurrence and type classifier using one or more machine learning methods as discussed in detail below using that acquired data.

Likewise, the process of applying the trained classifier to classify a driver's ongoing driving activity includes acquiring data from the driver's vehicle indicative of vehicle actions, which may be acquired by one or more sensors on the vehicle, on a portable device associated with the driver (such as a cell phone), or such other device capable of position/location identification (such as through use of a GPS or similarly configured sensor) and detection of vehicle actions, such as steering, braking, lane changing, speed, and the like, and apply the trained classifier to make a decision of whether a driver distraction has occurred based on the data from the driver's vehicle and road type for the road on which the vehicle is currently being operated, and if a driver distraction has occurred determine the type of distraction (e.g., reading or sending a text message, issuing a voice command to a mobile device, engaging in a hand-held telephone call, engaging in a hands-free telephone call, eating and/or drinking, and changing clothes). In the event of a determination that a driver distraction has taken place, the system may then automatically engage a countermeasure that is specific to the determined type of distraction (e.g., turn off the radio, disengage a telephone call, issue an audible or visual warning to the driver, etc.), and optionally may record the occurrence of the distraction event in local or remote memory and optionally alert a third party monitoring computer of the occurrence of the driver distraction.

As shown in the schematic view of FIG. 1 and in accordance with certain aspects of an embodiment of the invention, a system 100 for detecting and classifying a type of driver distraction includes a distraction classification training device 120, a distraction occurrence and type determination device 140, and database 130 that stores profiles of driver vehicle action and road type data that are indicative of particular driver distractions, as discussed further below. Each of distraction classification training device 120, distraction type determination device 140, and database 130 may be in data connection with one another, either as separate processing components in a single computing system, as separate computing elements on a network, some combination of the foregoing, or such other architectures as will occur to those of ordinary skill in the art. Further and as discussed in greater detail below, distraction classification training device 120 may further be in data communication with a driving simulator 150, and distraction occurrence and type determination device 140 may further be in data communication with vehicle sensor systems 200 on vehicles associated with drivers that are to be monitored by system 100, and optionally one or more monitoring entity computers 300, which monitoring entity computers 300 may be associated with a guardian of a monitored driver, an insurance company, a law enforcement authority, or the like. Optionally, distraction classification training device 120 and distraction occurrence and type determination device 140 may communicate with driving simulator 150, vehicle sensor systems 200, and monitoring entity computers 300 through any combination of wired or wireless data communication, including by way of non-limiting example via a wide area network 500 such as the Internet.

Distraction classification training device 120 includes a processor 122 for controlling the training of system 100 by generating distraction classifications that may be compared to distraction classifications computed from vehicle data captured by distraction occurrence and type determination device 140. Processor 122 controls the overall operation of distraction classification training device 120 by executing processing instructions, which are stored in memory 124 in data communication with processor 122. As further detailed below, memory 124 of distraction classification training device 120 may comprise any tangible computer readable medium now existing or implemented in the future and as will readily occur to those of ordinary skill in the art. Likewise, distraction classification training device 120 may comprise a networked device or may be on a network that enables data communication among the elements of system 100.

In order to train various driver vehicle action and road type data profiles as particular occurrences and types of driver distraction, memory 124 includes a driving simulator data classification module 126, which is adapted to acquire driver vehicle action and road type data from driving simulator 150, analyze that data using the machine learning methods discussed below to create classifications of driver distractions for that data at least at times during the driving simulation at which the driver engages in an intentional distracting event, and store those distraction occurrence and type classifications in memory 130. Data from driving simulator 150 may be received by distraction classification training device 120 live during a simulated driving experience, downloaded from driving simulator 150, or downloaded from an intermediate storage device that receives such data from driving simulator 150, all without departing from the spirit and scope of the invention.

Distraction classification training device 120 also preferably includes a communications interface 128 enabling distraction classification training device 120 to communicate with external devices, and in particular is adapted to receive driver vehicle action and road type data as input, and to provide distraction occurrence and type classifications of profiles of driver vehicle action and road type data as output.

In an exemplary configuration, driving simulator 150 includes a driver interface that may include a steering wheel, accelerator and brake pedals, gear shift, dashboard, and screens that provide the driver with a panoramic view of their simulated driving environment. In an exemplary configuration, driving simulator system 150 may include driving simulator software that is commercially available from FORUM8 Company, Ltd. of Tokyo, Japan. Driving simulator system 150 enables the creation and design of network elements, such as traffic signals, differing terrains, road alignments, signage, traffic generation, and varying weather conditions, as well as static objects such as three-dimensional buildings and trees. Driving simulator system 150 may thus allow for the creation of a highly realistic network of actual cities, with drivers being capable of choosing their own route to reach their intended destinations. Driving simulator system 150 may capture data such as steering wheel control, braking, acceleration, travel times, lane changing information, traffic mix, and speed, among such other simulated driving data as may be desired by those skilled in the art. Preferably, driving simulator 150 collects a data file for each driving session and stores such simulated driving data for each simulated driving session of a driver, which simulated driving data may then be electronically transmitted to distraction classification training device 120 for further processing as discussed in greater detail below.

Next and as mentioned above, memory 130 is in data communication with distraction classification training device 120 and serves as a data repository of classifications of distraction occurrence and type received from distraction classification training device 120 and may be accessed by distraction occurrence and type determination device 140. In certain exemplary configurations, distraction classification training device 120 may be in communication with a server that includes a processor and memory, such as memory 130, or that has access to memory 130.

Distraction occurrence and type determination device 140 is likewise in data communication with memory 130, and additionally is in data communication with one or more vehicle sensor systems 200. As noted above, vehicle sensor systems 200 may include one or more sensors on the vehicle, on a portable device associated with the driver (such as a cell phone), or such other device capable of position/location identification (such as through use of a GPS or similarly configured sensor) and detection of vehicle actions, such as steering, braking, lane changing, speed, and the like. Distraction occurrence and type determination device 140 is adapted to acquire the data from vehicle sensor system 200 from one or more monitored vehicles, and apply the trained classifier as discussed herein to make a decision of whether a driver distraction has occurred based on the data from the driver's vehicle and road type for the road on which the vehicle is currently being operated, and if a driver distraction has occurred determine the type of distraction (e.g., reading or sending a text message, issuing a voice command to a mobile device, engaging in a hand-held telephone call, engaging in a hands-free telephone call, eating and/or drinking, and changing clothes).

Distraction occurrence and type determination device 140 includes a processor 142 and memory 146, along with a communications interface 148. Memory 146 includes computer-executable instructions for implementing vehicle sensor system data classification module 146, as discussed in further detail below. Communications interface 148 is configured to provide data communication with memory 130, vehicle sensor systems 200, and optionally monitoring entity computer 300. Processor 142, memory 146, and communications interface 148 may be configured similarly to processor 122, memory 124, and communications interface 128 of distraction classification training device 120.

Vehicle sensor system data classification module 146 is adapted to acquire driver vehicle action and road type data from one or more vehicle sensor systems 200 as the vehicle is being operated, and data are analyzed to apply a classification of driver distractions from distraction occurrence and type classifications in memory 130. In the event that vehicle sensor system data classification module 146 determines that a driver distraction has occurred, distraction occurrence and type determination device 140 may then be employed to communicate an instruction to vehicle sensor system 200 to generate an audible or visual alert to the driver or take other intervening countermeasures to interrupt the driver distraction, and/or may alert monitoring entity computer 300 of the occurrence of such distraction event to allow additional intervention, including possible modification of insurance rates based on driving behavior, enforcement of driving laws and regulations, and the like.

As noted above, a number of machine learning methods may be implemented for purposes of enabling distraction classification training device 120 to generate distraction occurrence and type classifications for use by distraction occurrence and type determination device 140. For example, driver distraction may be detected and classified based on differing road types as noted above by applying one or multiple previously known machine learning methods, using data from driving simulator 150 as inputs to the machine learning model. More particularly, specific driving behaviors, preferably including some combination of lane changes, vehicle speed, collision incidence, braking, throttle, and steering are used as inputs, along with designation of road types (preferably including some combination of rural collectors, freeways, urban arterials, and local roads) may comprise the inputs to the machine learning model.

In an initial implementation configured in accordance with certain aspects of the invention, driving simulation sessions were conducted with a number of test subjects of varying demographic backgrounds, and each simulation driver's driving performance was examined under different forms of distraction (i.e., composing and reading text messages, engaging in voice commands, conducting a hand-held call, conducting a hands-free call, eating and drinking, and changing clothes while driving) on different road types. Participants drove the same route through the above-described varying road types, each receiving a particular distracting task to perform during their drive. Driving performance data was then collected for distraction classification using machine learning methods.

Support Vector Machine (SVM) classification is a machine learning and pattern classification algorithm that finds the maximum marginal hyperplane to minimize classification error. SVM uses a kernel function to map training data from the original input space to a high-dimensional feature space. When the data are linearly separable in the feature space, the hyperplane that maximizes the margin between classes yields the minimized upper bound of generalization error. However, when the data are not linearly separable, a positive penalty parameter is introduced to permit training error by specifying the cost of misclassifying training instances and find the soft margin. The classification of some known point in input space $x_i$ is $y_i$ which is defined to be either −1 or +1. If x' is a point in input space with unknown classification, then $$y'=\text{sign}(\Sigma_{i=1}^{n}\alpha_i y_i K(x_i,x')+b)$$

where y' is the predicted class of point x'. The function K( ) is the kernel; n is the number of support vectors; $\alpha_i$ are adjustable weights and b is a bias. The training process of SVM is to minimize both training error and the upper bounds of generalization error. This method is computationally effective and reduces generalization error to avoid over-fitting. SVM yields more robust models in comparison with the linear-regression algorithms that minimize the mean square error, which can be seriously affected by outliers in training data.

In this initial implementation, statistical preprocessing of the data from driving simulator 150 was conducted using analysis of variance (ANOVA) techniques and post hoc Tukey to find differences in distracted driving behavior on different road types. Speed, throttle (ratio on the acceleration pedal from 0 to +1 in which 0 means no throttle and +1 is full throttle), brake (ratio on the brake pedal from 0 to +1 in which 0 means no braking force and +1 is maximum brake force), steering velocity (rotation rate of the steering wheel per second), offset from road center (offset of the vehicle's position from the center of the road in meters; a negative number shows the offset toward left and a positive number shows the offset toward right), lane change, collision, and brake light (frequency of brake lights turning on) are dependent variables, and road type (rural, freeway, urban, and local) is the independent variable.

All variables are only for the distraction period; all but lane changing and brake light (total number during distraction) are the averages over the distracting period for all types of distraction for each road.

Since different road types have different speed limits and numbers of lanes, to have a fair comparison of driving behavior under distraction on different roads, data was first normalized and then an ANOVA analysis was performed. The speed limit on the rural road was 30 mph, the freeway was 55, the urban arterial was 45 and the local road was 30; also, the number of lanes in each direction on the rural road was one, the freeway was three, the urban arterial was two, and the local road was one. To normalize speed, vehicle speed was subtracted from the speed limit and divided by the speed limit. For normalizing the lane change, a number of lanes changing per lane was calculated. The result of the ANOVA (Table 1 below) shows that distracted driving behavior is significantly different under different road types for all variables except collision.

TABLE 1

Descriptive and ANOVA Analysis

| | Variables | N | Mean | Std. Deviation | F | Sig. |
|---|---|---|---|---|---|---|
| Normalized Speed | Rural Road | 402 | 0.263 | 0.314 | 865.849 | 0.00 |
| | Freeway | 800 | −0.128 | 0.088 | | |
| | Urban Arterial | 399 | −0.336 | 0.126 | | |
| | Local | 351 | −0.321 | 0.219 | | |
| Throttle | Rural Road | 402 | 0.230 | 0.111 | 287.391 | 0.000 |
| | Freeway | 800 | 0.243 | 0.094 | | |
| | Urban Arterial | 399 | 0.114 | 0.062 | | |
| | Local | 351 | 0.111 | 0.094 | | |
| Brake | Rural Road | 402 | 0.041 | 0.048 | 370.743 | 0.000 |
| | Freeway | 800 | 0.007 | 0.007 | | |
| | Urban Arterial | 399 | 0.068 | 0.055 | | |
| | Local | 351 | 0.149 | 0.138 | | |

TABLE 1-continued

Descriptive and ANOVA Analysis

| Variables | | N | Mean | Std. Deviation | F | Sig. |
|---|---|---|---|---|---|---|
| Steering | Rural Road | 402 | 0.012 | 0.009 | 187.104 | 0.000 |
| Velocity | Freeway | 800 | 0.031 | 0.021 | | |
| | Urban Arterial | 399 | 0.016 | 0.010 | | |
| | Local | 351 | 0.013 | 0.015 | | |
| Offset from | Rural Road | 402 | 1.077 | 0.640 | 223.594 | 0.000 |
| Road Center | Freeway | 800 | 3.679 | 2.887 | | |
| | Urban Arterial | 399 | 2.418 | 2.124 | | |
| | Local | 351 | 0.726 | 0.441 | | |
| Normalized Lane | Rural Road | 402 | 0.000 | 0.000 | 380.228 | 0.000 |
| Change | Freeway | 800 | 0.507 | 0.549 | | |
| | Urban Arterial | 399 | 0.816 | 0.492 | | |
| | Local | 351 | 0.000 | 0.000 | | |
| Collision | Rural Road | 402 | 0.000 | 0.000 | 1.811 | 0.143 |
| | Freeway | 800 | 0.010 | 0.111 | | |
| | Urban Arterial | 399 | 0.005 | 0.100 | | |
| | Local | 351 | 0.000 | 0.000 | | |
| Brake Light | Rural Road | 402 | 1.264 | 2.414 | 87.713 | 0.000 |
| | Freeway | 800 | 0.369 | 1.150 | | |
| | Urban Arterial | 399 | 3.291 | 5.395 | | |
| | Local | 351 | 1.222 | 2.319 | | |

As shown in Table 1, speed on the rural road had the highest ratio to its speed limit under distraction, which could be due to lower cognitive load of this road type compared to other roads; i.e., only one lane in each direction, low traffic, very few intersections and stop signs. Conversely, local roads in a school zone had the lowest ratio to its speed limit under distraction due to higher cognitive load; i.e., the presence of pedestrians and frequent stop signs. Drivers generally reduce their speed when distracted. However, results show that they reduce their speed on local roads in a school zone the most, followed by the urban arterial, and then the freeway. On rural roads, their speed is over the speed limit when distracted. This ranking can be explained by cognitive load. As expected, the number of lane changes is the highest on urban arterials. Also, as expected, steering velocity and offset from the lane center are the highest on the freeway, then the urban road, then rural and, lastly, local road due to their speed limit. Throttle and brake rankings are a freeway, rural, urban, and local due to speed and cognitive load. An average number of brake lights rankings is urban arterial, rural, local, and freeway, probably due to a combination of interruptions/cognitive load and speed limit.

Tukey post hoc analysis, as shown in Table 2 below, shows that there is a statistically significant difference in the mean of speed, throttle, brake, steering velocity, offset from road center, lane change, and brake light among different road types.

TABLE 2

Tukey Post Hoc Analysis of Distracted Driving Behavior

| Variables | | | Mean Difference (I-J) | Std. Error | Sig. |
|---|---|---|---|---|---|
| Normalized | Rural | Freeway | 0.3909* | 0.01149 | 0.000 |
| Speed | Road | Urban Arterial | 0.59923* | 0.01328 | 0.000 |
| | | Local | 0.58342* | 0.01373 | 0.000 |
| Throttle | Rural | Freeway | −0.01374 | 0.00567 | 0.073 |
| | Road | Urban Arterial | .11520* | 0.00655 | 0.000 |
| | | Local | .11909* | 0.00677 | 0.000 |
| Brake | Rural | Freeway | .03421* | 0.00412 | 0.000 |
| | Road | Urban Arterial | −.02647* | 0.00476 | 0.000 |
| | | Local | −.10763* | 0.00493 | 0.000 |

TABLE 2-continued

Tukey Post Hoc Analysis of Distracted Driving Behavior

| Variables | | | Mean Difference (I-J) | Std. Error | Sig. |
|---|---|---|---|---|---|
| Steering | Rural | Freeway | −.01881* | 0.00098 | 0.000 |
| Velocity | Road | Urban Arterial | −.00354* | 0.00113 | 0.010 |
| | | Local | −0.00088 | 0.00117 | 0.876 |
| Offset from | Rural | Freeway | −2.60195* | 0.12912 | 0.000 |
| Road Center | Road | Urban Arterial | −1.34103* | 0.14925 | 0.000 |
| | | Local | 0.35134 | 0.15429 | 0.104 |
| Normalized | Rural | Freeway | −0.50708* | 0.02543 | 0.000 |
| Lane Change | Road | Urban Arterial | −0.81578* | 0.02940 | 0.000 |
| | | Local | 0.00000 | 0.03039 | 1.000 |
| Collision | Rural | Freeway | −0.01000 | 0.00517 | 0.213 |
| | Road | Urban Arterial | −0.00501 | 0.00597 | 0.836 |
| | | Local | 0.0000 | 0.00617 | 1.000 |
| Brake Light | Rural | Freeway | .89493* | 0.17986 | 0.000 |
| | Road | Urban Arterial | −2.02705* | 0.20791 | 0.000 |
| | | Local | 0.04146 | 0.21492 | 0.997 |

*The mean difference is significant at the 0.05 level.

In order to validate the above model, data was randomly split for each subject set (1,952 experiments) into training (80% of the samples) and independent test sets (20% of the samples). As a result, there were 1,587 samples in the training data set and 365 samples in the testing data set. Results were then reported for 10-fold cross-validation on the training data as well as the results on the independent test set. In 10-fold cross-validation, the data is randomly divided into 10 equal subgroups in which in each iteration, nine subgroups are combined as training data and the remaining subgroup is used as the testing data. This process is repeated 10 times, equal to the number of subgroups. Data were sampled at random from the training set as all data used in this study were properly labeled as distracted under four different road conditions. For a fair comparison, the random data partition was conducted once and saved, and different algorithms were run over the same classification.

Here four different distraction definitions are classified based on the road types (rural collector, freeway, urban arterial, and local road in a school zone) using SVMs. To provide more insight into the performance of SVM, we report sensitivity, precision, Matthew Correlation Coefficient (MCC), Area Under the Curve (AUC), and total Accuracy (ACC). The achieved results using 10-fold cross-validation and independent test set are shown in Table 3 below.

TABLE 3

Results achieved using SVM for 10-fold cross-validation and independent test set

| | Sensitivity | Precision | MCC | AUC | ACC |
|---|---|---|---|---|---|
| Results of 10-fold cross-validation | | | | | |
| Rural Collector | 92.30% | 92.30% | 90.30% | 97.20% | — |
| Freeway | 97.80% | 93.30% | 92.30% | 96.60% | — |
| Urban arterial | 94.00% | 98.20% | 95.10% | 98.40% | — |
| Local road in a School Zone | 86.90% | 92.40% | 87.40% | 96.50% | — |
| Total | | | | | 93.90% |
| Results of Independent Test | | | | | |
| Rural Collector | 93.40% | 98.60% | 95.00% | 98.40% | — |
| Freeway | 99.30% | 89.80% | 90.30% | 95.90% | — |
| Urban arterial | 92.00% | 98.60% | 94.10% | 98.30% | — |
| Local road in a School Zone | 85.90% | 96.50% | 89.30% | 94.40% | — |
| Total | | | | | 94.24% |

Next, Random Forest is another machine learning method which may be applied for purposes of determining and classifying driver distraction and was likewise performed on the foregoing data captured from driving simulator 150. In this implementation, the driving performance data consisted of average speed, throttle, lane changing, brake, collision, steering wheel velocity, brake light, and offset from the lane center for each scenario before and during the distraction area. The distraction area's length varied based on the road types, as the speed limit was different. Those driving performance measures were considered because when drivers are physically, visually, and/or cognitively distracted, their driving performance deteriorates. In the designed distraction area on each road, the participants were asked a question that they needed to think about and answer in hand-held, hands-free, texting, and voice command scenarios. They were asked to perform a task, such as eating/drinking or removing/adding clothing in the last two scenarios. For example, in the hands-free calling scenario, an observer called participants 5 times and asked them five different questions. The participants were required to use hands-free and answer the question. For example, the questions how many of their friends' names start with M? differed each time but were designed to have similar cognitive loads. Two areas, including before distraction area (no distraction) and during the distraction area, classified the binary states of distraction (i.e., distracted vs. non-distracted) for the analysis. In the driving experiment, participants drove six different driving scenarios with the distraction task, including hands-free calling, hand-held calling, voice command, texting, removing/putting on clothing, and eating/drinking. There were a total of 3,904 simulator experiences executed by 92 participants, half of which, or 1,952, contained distraction.

The Random Forest ("RF") machine learning method is a straightforward extension of the bagging classifier aiming to enhance diversity among the base classifiers by using a random feature set to enhance diversity in the classification method. A bagging classifier consists of a group of base classifiers called weak learners trained on the random subset of available training data. It then combines all the classifiers' outputs for a given sample using majority voting to produce the final output. It can be used with any classifier as its base learner and focuses on those classifiers' predictions to achieve its best performance.

The RF classifier incorporates feature subset selection methods to enhance diversity and, consequently, classification performance compared to the bagging classifier. In RF, each base learner (which is usually a basic decision tree) is trained with the best features among a set of M randomly chosen features among N features contained in the features vector to encourage diversity between base classifiers. That is why it is called the Random Forest. Such a small change proved to be an effective method to enhance the performance of the machine learning method discussed herein compared to other ensemble classifiers. The RF is an appropriate classifier when the number of samples is limited and in a noisy environment. Hence, it is potentially very effective for the instant method.

The best features are selected based on the Gini Index between the M selected features. Consider a training set $D=\{(x_i,y_i)\}$ where i=1, . . . , m in which each sample $T_i=(x_i,y_i)$ is described by an input attribute vector $x_i=(x_{i,1}, x_{i,2}, x_{i,3}, \ldots, x_{i,N})$ and sample label $y_i$, while A is a binary feature of N features in the feature vector:

$$Gini_A(D) = \frac{|n_1|}{|n|}Gini(D_1) + \frac{|n_2|}{|n|}Gini(D_2)$$

Where $D_1$ and $D_2$ are the binary partitions of D by A which each has $n_1$ and $n_2$ records, respectively:

where $n = n_1 + n_2$ $D_1 \cup D_2 = D$ and $D_1 \cap D_2 = \emptyset$ $$Gini(D) = 1 - \sum_{i=1}^{n} p(y_i = C_i)$$

where $p(y_i = C_i) = \frac{|C_{i,D}|}{|D|}$

Where $C_{i,D}$ is the number of correctly classified samples for the class i. Here we use RF implemented in WEKA, an open-source data mining and machine learning toolkit, for the classification task using decision stump as its weak learner. Multiple values for base learners were also tried and the best results were achieved using 100.

As a strong traditional prediction model, binary logit was used to predict the probability of driving distraction. Table 4 below shows the significant relationship between speed, throttle, brake, steering velocity, and lane change which can be used in the prediction model. Using a calibrated logit model, the prediction model resulted in a 60% prediction accuracy that did not seem very promising considering two options. Other soft models, such as the Bayesian network and the Random Forest, were tested and discussed below.

TABLE 4

Binary Logit Results

|  | B | Sig. |
|---|---|---|
| Constant | −1.387 | 0.000 |
| Speed | 0.047 | 0.000 |
| Throttle | −5.510 | 0.000 |
| Brake | 9.928 | 0.000 |
| Steering Velocity | −22.843 | 0.000 |
| Offset from Road Center | −0.008 | 0.757 |
| Lane Change | 0.140 | 0.000 |
| Collision | 0.143 | 0.762 |
| −2 Log-likelihood: | 2935.654 |  |
| Cox & Snell R Square: | 0.165 |  |
| Nagelkerke R Square: | 0.220 |  |

As noted above, the benchmark contained 3,904 samples in which half, or 1,952, contained distraction. To be able to compare our results with previous studies directly, the benchmark was divided into a train and an independent test set with an 80:20 ratio. Training sets consisting of 1,563 samples and a testing set consisting of 389 samples were produced.

K-fold cross-validation is a popular evaluation method in machine learning. It aims at using available data for training and testing in an efficient way. In this model, the sample set is divided into K mutually exclusive subsets. In each iteration, K−1 of those sample sets are used to train a model, while the remaining subset is used for testing. This process is repeated K times and until all the subsets are used precisely once for testing purposes. As a result, the available benchmark is used K times to do the K test and produce prediction performance for all of the samples. Among different values, K=10 is typically the most popular, which is also shown to be a sufficient and practical value for this parameter. Note that 10-fold cross-validation is just used for the training set. The independent test set is fully isolated and has not been used in any training steps. In this case, the whole training data is used to train an RF and use it to predict the independent test set and validate the instant model's performance.

The prediction accuracy (ACC), sensitivity (true positive rate), precision, Matthews Correlation Coefficient (MCC), and Area Under the Curve (AUC) were reviewed to evaluate performance of the instant model in classifying driver distraction. The results of using 10-fold cross-validation on the training set, and the results achieved for independent test sets, are shown in Tables 5 and 6 below. As shown in Table 4, the Bayesian Network model achieved 67.8% prediction accuracy. While this result is better than the binary logistic approach, the RF model resulted in an additional 8.2% improvement in prediction accuracy, as depicted in Table 5. 76.6% sensitivity was consistently achieved, which demonstrates the RF model's accuracy in predicting whether a driver is distracted. This result is 14% better than the 62.6% sensitivity demonstrated in the Bayesian Network analysis.

TABLE 5

Bayesian Network Result

|  | Sensitivity | Precision | MCC | AUC | ACC |
|---|---|---|---|---|---|
| Results for 10-fold cross-validation ||||||
| Before Distraction | 61.60% | 75.50% | 42.30% | 77.70% | — |
| During Distraction | 80.00% | 67.60% | 42.30% | 77.70% | — |
| Total |  |  |  |  | 70.80% |
| Results for Independent Test ||||||
| Before Distraction | 73.00% | 66.00% | 35.80% | 75.10% | — |
| During Distraction | 62.60% | 69.90% | 35.80% | 75.10% | — |
| Total |  |  |  |  | 67.80% |

TABLE 6

Random Forest Results for 10-fold Cross-Validation and Independent Test Set

|  | Sensitivity | Precision | MCC | AUC | ACC |
|---|---|---|---|---|---|
| Results for 10-fold cross-validation ||||||
| Before Distraction | 78.80% | 77.00% | 53.80% | 80.90% | — |
| During Distraction | 77.00% | 76.80% | 53.80% | 81.40% | — |
| Total |  |  |  |  | 76.89% |
| Results for Independent Test ||||||
| Before Distraction | 76.60% | 76.40% | 53.00% | 86.10% | — |
| During Distraction | 76.40% | 76.60% | 53.00% | 86.10% | — |
| Total |  |  |  |  | 76.50% |

As shown in Table 6, 0.861 MCC is also reported, which demonstrates that the model herein consistently performed well in predicting positive and negative samples. In other words, the model can accurately predict if a driver is distracted for most of the cases, as accurately as when the driver is not distracted. As shown, the results achieved using 10-fold cross-validation are consistent with the results achieved using an independent test set to evaluate the instant model. Such consistent results demonstrate the generality of the model to confidently predict driver distraction.

Next, the impact of factors used in this study on the achieved results was investigated. Each feature was removed one at a time, and the RF model was run on the remaining set of factors. In this way, analysis could be performed on the importance of each feature in the distraction detection task. The results of this experiment are shown in Table 7 below. As shown, the highest drop in prediction performance occurred when the 'Speed' and 'Steering Velocity' factors were removed, which highlights the importance of these factors compared to other factors. Simultaneously, the slightest drop in prediction performance occurred when 'Brake Light' and 'Offset from Road Center' were removed. The prediction accuracy slightly increased in 10-fold cross-validation when 'Brake Light' was removed. Similarly, there was a slight increment in prediction accuracy on the independent test set when 'Offset from Road Center' was removed. However, in both cases, the increment is not consistent for independent tests and 10-fold cross-validation. Besides, the sensitivity is higher when all the factors are used together to predict distraction. This demonstrates the importance of using all the factors employed in this study on the achieved results.

TABLE 7

Sensitivity Analysis of RF Factors for 10-fold cross-validation and independent test sets

| Removed Variable | Class | Results for 10-fold cross-validation | | | | | Results for Independent Test | | | | |
| --- | --- | --- | --- | --- | --- | --- | --- | --- | --- | --- | --- |
| | | Sensitivity | Precision | MCC | AUC | ACC | Sensitivity | Precision | MCC | AUC | ACC |
| Speed | Before Distraction | 76.8% | 71.5% | 46.3% | 82.0% | — | 77.4% | 70.8% | 45.8% | 80.1% | — |
| | During Distraction | 69.4% | 74.9% | 46.3% | 82.0% | — | 68.2% | 75.1% | 45.8% | 80.1% | — |
| | Total | | | | | 73.1% | | | | | 72.8% |
| Throttle | Before Distraction | 75.3% | 73.9% | 48.7% | 83.5% | — | 73.0% | 73.6% | 46.9% | 83.9% | — |
| | During Distraction | 73.4% | 74.80% | 48.70% | 83.50% | — | 73.80% | 73.30% | 46.90% | 83.90% | — |
| | Total | | | | | 74.4% | | | | | 73.4% |
| Brake | Before Distraction | 73.7% | 74.2% | 48.1% | 82.1% | — | 72.8% | 73.5% | 46.6% | 84.3% | — |
| | During Distraction | 74.4% | 73.9% | 48.1% | 82.1% | — | 73.8% | 73.1% | 46.6% | 84.3% | — |
| | Total | | | | | 74.0% | | | | | 73.3% |
| Brake Light | Before Distraction | 77.9% | 76.7% | 54.2% | 86.5% | — | 75.3% | 74.2% | 49.2% | 85.2% | — |
| | During Distraction | 76.3% | 77.5% | 54.2% | 86.5% | — | 73.8% | 75.0% | 49.2% | 85.2% | — |
| | Total | | | | | 77.1% | | | | | 74.6% |
| Lane Changing | Before Distraction | 77.4% | 76.4% | 53.4% | 86.0% | — | 72.2% | 74.7% | 47.9% | 84.5% | — |
| | During Distraction | 76.1% | 77.0% | 53.4% | 86.0% | — | 75.6% | 73.2% | 47.9% | 84.5% | — |
| | Total | | | | | 76.7% | | | | | 73.9% |
| Offset from Road Center | Before Distraction | 77.3% | 76.0% | 52.9% | 85.9% | — | 76.9% | 76.5% | 53.3% | 86.7% | — |
| | During Distraction | 75.6% | 76.9% | 52.9% | 85.9% | — | 76.4% | 76.8% | 53.3% | 86.7% | — |
| | Total | | | | | 76.4% | | | | | 76.6% |
| Steering Velocity | Before Distraction | 73.5% | 73.0% | 46.3% | 82.4% | — | 70.2% | 71.5% | 42.2% | 81.0% | — |
| | During Distraction | 72.8% | 73.3% | 46.3% | 82.4% | — | 72.1% | 70.8% | 42.2% | 81.0% | — |
| | Total | | | | | 73.2% | | | | | 71.1% |

As noted above, Random Forest machine learning methods may likewise thus be used in the system and methods set forth herein to successfully predict driver distraction based on driving performance data.

Still further, machine learning methods may be applied to the data received from driving simulator 150 to train distraction classifications particularly to identify different distraction types (e.g., texting, conducting a hand-held telephone call, conducting a hands-free telephone call, issuing voice commands and engaging voice to text applications, eating and/or drinking, and putting on or removing clothing), based on driving behavior.

In a system and method configured in accordance with aspects of the invention to identify distraction type, what constitutes a driving distraction is based upon a driver's performance and reaction to the distracting activity. Particularly, when a driver is engaged in a distractive task, two options may occur:
  (i) The driver may not get distracted, i.e., the distraction is not identifiable in their driving behavior. This might be due to low level of distractive activity, the driver's multitasking ability, etc.
  (ii) The driver may get distracted, and an external observer would perceive the distraction by instantaneous abnormal driving behavior. This case may or may not result in a crash depending upon the position of adjacent vehicles.
Therefore, the distraction here may be defined as a visible change in driving performance, i.e., sudden drop in speed, sudden change in steering velocity, or sudden lateral displacement. In the driving simulator environment, during a driving simulation session an examiner was in charge of executing the particular distractive task; however, similar to the real-world scenario, not all driving subjects in fact appeared to be distracted. Some subjects demonstrated no symptom of distraction in their speed, brake, steering, and lateral position. The purpose of this study is to identify distraction and categorize its different types if the subject was in fact distracted, not necessarily engaged in a distractive task. To this purpose, new variables that can formulate the sudden changes in driving behavior were developed to better identify distraction behaviors. Thus, driving performance data, such as speed, steering, steering velocity, acceleration, offset from road center, that have been collected on a second-by-second basis were transformed to show the rate of change in driving performance in every second. For example, the new speed drop variable was calculated as follows:

$$SD_i = S_i - S_{i-1}$$

Where,
  $SD_i$: Speed Drop at Second i;
  $S_{i-1}$: Speed at second i−1 (past record's speed).
Using transformed variables of speed drop, steering change, acceleration drop, and change in the offset from the road center, new variables were defined, preliminarily evaluated, and utilized in the modeling process, as listed in Table 8 below to capture distraction in driving performance. For instance, "maximum speed drop" was computed by finding the maximum speed change in any two successive seconds of simulation, during the 30 seconds of distraction.

TABLE 8

Primitive and final variables used for the study

| Number | Variable |
|---|---|
| 1 | Variance of speed differences |
| 2 | Variance of lateral displacement |
| 3 | Maximum speed difference |
| 4 | Maximum lateral displacement |
| 5 | Maximum speed drop |
| 6 | Maximum steering |
| 7 | Maximum steering velocity |
| 8 | Sum of brake |
| 9 | Sum of Speed Oscillation |

After extensive testing of all the variables shown in Table 8, maximum speed drop, maximum steering, and maximum steering velocity were found to be most significant in the final models.

More particularly, various models were first developed using only "no distraction" scenarios with each of the distraction scenarios described herein. WEKA workbench was used for data mining and data classification purposes. Variables used in this process were maximum speed drop, maximum steering, and maximum of steering velocity. The base scenario with no distraction was compared with distracted scenarios using the AutoWeka features of the workbench to find the most suitable classifiers. Models were trained using the 80% split and were tested on the remaining 20%. The 10-fold cross validation technique was used for testing both calibration and validation of those models. From that analysis, results showed acceptable accuracy, as shown in Table 9 below. In most cases, accuracy of classification of the test data set is over 70% with fairly acceptable accuracy between calibrated models and validated test data sets.

TABLE 9

Binary classification results of no distraction vs. each of the distraction scenarios

| Scenarios | Calibration Results | | | Validation Accuracy | Classifier |
|---|---|---|---|---|---|
| | Correctly classified instances | Incorrectly classified instances | Percent Correct | | |
| No Distraction vs Hands-free call | 69 | 13 | 84% | 81% | Lazy IBk |
| No Distraction vs Hand-held call | 66 | 20 | 77% | 70% | Voted Perceptron |
| No Distraction vs Voice to text | 81 | 7 | 92% | 71% | Random Forest |
| No Distraction vs Texting | 58 | 20 | 74% | 70% | J48 (decision tree) |
| No Distraction vs Taking on/off clothes | 56 | 7 | 89% | 88% | Vote |
| No Distraction vs Eating/Drinking | 48 | 14 | 77% | 88% | Lazy Kstar |

With regard to distraction scenarios, classification models were also run for each two distractions using the same methods. The same variable was used to examine the different impacts of each two distraction scenarios with each other. Models were trained and calibrated on an 80% split of the data for training and validated on the remaining 20% of the dataset. For both validation and calibration, 10-fold cross validation was used for testing. Results of ML models are presented in Table 10 below.

TABLE 10

Result of classification of different distractions

| Scenarios | Calibration | | | Validation Accuracy | Classifier |
|---|---|---|---|---|---|
| | CCI * | ICI ** | Percent Correct | | |
| Hands free call vs Hand-held call | 71 | 34 | 68% | 57% | Lazy IBk |
| Hands free call vs Voice to text | 91 | 12 | 88% | 62% | Random Tree |
| Hands free call vs Texting | 63 | 34 | 65% | 62% | Attribute Selected Classifier |
| Hands free call vs Taking on/off clothes | 40 | 15 | 73% | 43% | SGD |
| Hands free call vs Eating/Drinking | 37 | 17 | 69% | 43% | SMO |

TABLE 10-continued

Result of classification of different distractions

| Scenarios | Calibration | | Percent Correct | Validation Accuracy | Classifier |
|---|---|---|---|---|---|
| | CCI * | ICI ** | | | |
| Hand-held call vs Voice to text | 72 | 33 | 69% | 72% | OneR |
| Hand-held call vs Texting | 47 | 55 | 46% | 46% | LMT |
| Hand-held call vs Taking on/off clothes | 56 | 1 | 98% | 47% | Random Forest |
| Hand-held call vs Eating/Drinking | 31 | 25 | 55% | 53% | AdaBoostM1 |
| Voice to text vs Texting | 70 | 29 | 71% | 56% | Attribute Selected Classifier |
| Voice to text vs Taking on/off clothes | 43 | 14 | 75% | 71% | AdaBoostM1 |
| Voice to text vs Eating/Drinking | 40 | 16 | 71% | 64% | Lazy LWL |
| Texting vs Taking on/off clothes | 48 | 8 | 86% | 64% | Random Tree |
| Texting vs Eating/Drinking | 36 | 19 | 65% | 43% | Decision Stump |
| Taking on/off clothes vs Eating/Drinking | 37 | 18 | 67% | 64% | Lazy Kstar |
| Hand-held call vs Voice to text vs Taking on/off clothes | 55 | 32 | 63% | 62% | Lazy Kstar |
| Hand-held call vs Voice to text vs Eating/Drinking | 50 | 36 | 58% | 43% | OneR |
| Hand-held call vs Taking on/off clothes vs Eating/Drinking | 42 | 43 | 49% | 43% | Random Tree |
| Voice to text vs Taking on/off clothes vs Eating/Drinking | 74 | 10 | 88% | 38% | AdaBoostM1 |

\* CCI: Correctly classified instances
\*\* ICI: Incorrectly classified instances Table 10 shows the accuracy of the models on the training data set and the 10-fold cross validation on the test data set. Different classifiers were found to be the most effective model on classifying each pair of distraction types, using the AutoWeka feature. Models such as Random Tree, AdaBoost, Random Forest, and Lazy IBk were able to discern distractions in 9 of the models with acceptable accuracy for both calibration and validation, as shown in Table 10 above.

As noted above, a variety of classifiers were used for this study. Lazy IBk, for instance, is a K-nearest neighbors classifier with the capability to select appropriate value of K based on cross-validation. Another instance-based classifier used in this study was Lazy Kstar that utilizes the class of a test instance based upon the class of those training instances similar to it as determined by some similarity function. Lazy Kstar classifier is different from other instance-based classifiers as it employs an entropy-based distance function. Random Tree and Random Forest models were other common classifiers used in this analysis that construct decision trees for classification. Besides these classifiers, boosters such as AdaBoost was also used that has the capability of improving the performance of the model, particularly to improve nominal class. Boosting is an approach to machine learning based on the idea of creating a highly accurate prediction rule by combining many relatively weak and inaccurate rules. The AdaBoost (short for "Adaptive Boosting") algorithm of Freund and Schapire was the first practical boosting algorithm, and it remains one of the most widely used and studied, with applications in numerous fields. It focuses on classification problems and aims to convert a set of weak classifiers into a strong one. The final equation for classification can be represented as $$F(x) = \text{sign}\left(\sum_{m=1}^{M} \theta_m f_m(x)\right),$$

Where $f_m$ stands for the $m^{th}$ weak classifier and $\theta_m$ is the corresponding weight. It is exactly the weighted combination of M weak classifiers.

Even though the t-test results from preliminary analysis manifested no significant difference between different classes, these models were able to achieve these results with comparably small training and sample sets. Validation accuracy of 71% and 72% for Voice to text vs Taking on/off clothes and Hand-held call vs Voice to text distraction scenarios respectively, are the highest achieved with this method. The highest accuracy for a model with multiclass classification was 63% for distraction scenarios Hand-held call, Voice to text, and Taking on/off clothes. This was the highest multiclass classification accuracy achieved in this study. Detailed analysis results containing precision, sensitivity, and accuracy of models with higher accuracy are displayed in Table 11 below. The best prediction power, with validation accuracy of 72%, was obtained classifying distractions due to "hand-held call" versus "voice to text". When classifying 3 types of distractions due to "hand-held call", "voice to text", and "taking on/off clothes", the machine learning model achieved 62% prediction accuracy in the validation dataset.

TABLE 11

Detailed performance information of final distraction classification models.

| Scenario | Calibration | | | | | Validation | | | | |
|---|---|---|---|---|---|---|---|---|---|---|
| | CCI | ICI | Accuracy | Sensitivity | Precision | CCI | ICI | Accuracy | Sensitivity | Precision |
| Hands free call vs Hand-held call | 71 | 34 | 68% | 0.676 | 0.709 | 16 | 12 | 57% | 0.571 | 0.602 |
| Hands free call vs Voice to text | 91 | 12 | 88% | 0.883 | 0.906 | 16 | 10 | 62% | 0.615 | 0.627 |
| Hands free call vs Texting | 63 | 34 | 65% | 0.649 | 0.656 | 16 | 10 | 62% | 0.615 | 0.618 |
| Hand-held call vs Voice to text | 72 | 33 | 69% | 0.686 | 0.69 | 21 | 8 | 72% | 0.724 | 0.73 |
| Voice to text vs Taking on/off clothes | 43 | 14 | 75% | 0.754 | 0.777 | 10 | 4 | 71% | 0.714 | 0.733 |
| Voice to text vs Eating/Drinking | 40 | 16 | 71% | 0.714 | 0.759 | 9 | 5 | 64% | 0.643 | 0.675 |
| Texting vs Taking on/off clothes | 48 | 8 | 86% | 0.857 | 0.859 | 14 | 9 | 64% | 0.643 | 0.646 |
| Taking on/off clothes vs Eating/Drinking | 37 | 18 | 67% | 0.673 | 0.68 | 9 | 5 | 64% | 0.643 | 0.646 |
| Hand-held call vs Voice to text vs Taking on/off clothes | 55 | 32 | 63% | 0.632 | 0.659 | 13 | 8 | 62% | 0.619 | 0.642 |

CCI: Correctly classified instances
ICI: Incorrectly classified instances

Based on the foregoing analysis, maximum speed drop, maximum steering, and maximum steering velocity were proven to provide consistently successful variables for use with the ANOVA, t-test, and ML classification models. Further, the best machine learning model demonstrated 72% prediction power in the validation set to distinguish hand-held call and Voice to text distraction types. This model was developed using the OneR classifier, which uses the minimum-error attribute for prediction, discretizing numeric attributes. Moreover, a multiclass classification was developed with a 62% accuracy classifying three distraction types of "hand-held call," "voice to text," and "taking on/off clothes." Further, the foregoing model showed that the factors of maximum speed drop, maximum steering, and maximum steering velocity were significantly more effective than other driving behaviors in determining distraction type.

Figure 2:
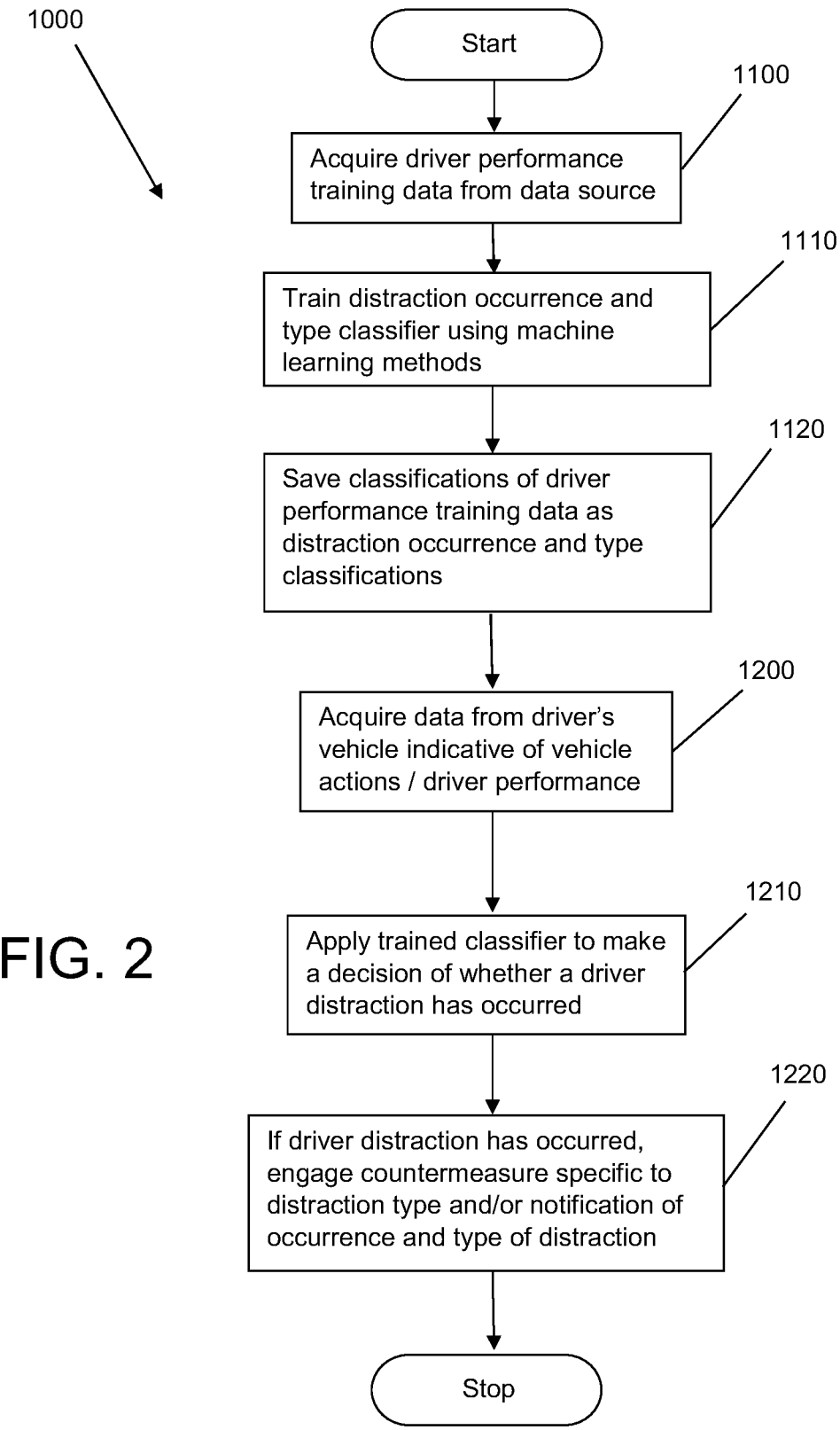
FIG. 2 is a flow chart illustrating an exemplary method for detecting and classifying a type of driver distraction according to certain aspects of an embodiment of the invention.

Next, FIG. 2 provides a flow chart illustrating an exemplary method for detecting and classifying a type of driver distraction in accordance with certain aspects of an embodiment of the invention. That method (identified generally by reference numeral 1000) may, by way of non-limiting example, be carried out by the system 100 for detecting and classifying a type of driver distraction as discussed above and shown in FIG. 1. In general, process 1000 includes a training portion for training a classifier to classify certain driver behaviors (as evidenced by sensed vehicle movements and conditions) as a distraction or non-distraction event, and if classified as a distraction event then also a type of distraction event, and then an application portion that uses the trained classifier to classify real-time driving behavior as exhibiting distracted or non-distracted driving behavior.

The training portion of process 1000 begins with acquiring data from a data source at step 1100, such as a driving simulator having a data capture device, including data indicative of vehicle actions (e.g., lane changes, vehicle speed, braking, throttle usage, and steering), and preferably data indicative of the road type and condition (e.g., road size/number of lanes, speed limit, traffic load, etc., and preferably including at least one or more of each of rural connectors, freeways, urban arterials, and local roads, such as local roads in a school zone), along with identification of a known type of distraction presented to the driver at a known location and time during the driving simulation. Data may be acquired at step 1100 from driving simulator 150 during a simulated driving experience, may be downloaded from driving simulator 150, or may be downloaded from an intermediate storage device that receives such data from driving simulator 150. After acquiring such data, the system at step 1110 trains a distraction occurrence and type classifier using one or more machine learning methods as discussed above using that acquired data, and at step 1120 saves classifications of the driver performance training data as distraction occurrence and type classifications.

Likewise, the process of applying the trained classifier to classify a driver's ongoing driving activity includes acquiring data from the driver's vehicle indicative of vehicle actions at step 1200, which may be acquired by one or more sensors on the vehicle, on a portable device associated with the driver (such as a cell phone), or such other device capable of position/location identification (such as through use of a GPS or similarly configured sensor) and detection of vehicle actions, such as steering, braking, lane changing, speed, and the like. Next, at step 1210, the process applies the trained classifier to make a decision of whether a driver distraction has occurred based on the data from the driver's vehicle and road type for the road on which the vehicle is currently being operated, and if it is determined that a driver distraction has occurred, then the process further applies the trained classifier to determine the type of distraction (e.g., reading or sending a text message, issuing a voice command to a mobile device, engaging in a hand-held telephone call, engaging in a hands-free telephone call, eating and/or drinking, and changing clothes). In the event of a determination that a driver distraction has taken place, the process may then at step 1220 automatically engage a countermeasure that is specific to the determined type of distraction (e.g., turn off the radio, disengage a telephone call, issue an audible or visual warning to the driver, etc.), and optionally may record the occurrence of the distraction event in local or remote memory and optionally alert a third party monitoring computer of the occurrence of the driver distraction.

Figure 3:
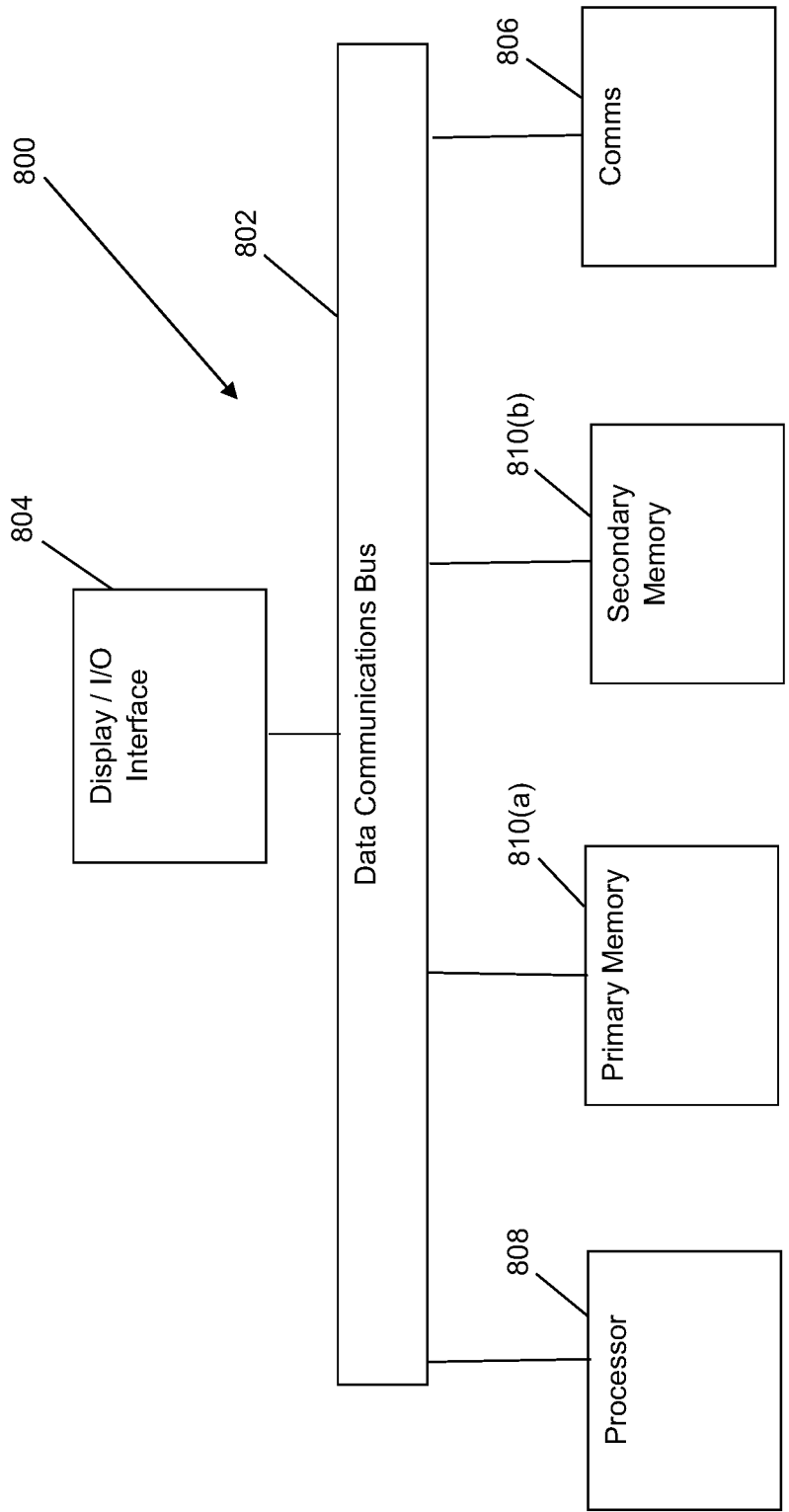
FIG. 3 is a schematic view of an exemplary computer system suitable for implementing one or more aspects of the methods described herein.

Next, FIG. 3 shows an exemplary computer system architecture 800 suitable for implementing the methods described herein, including providing exemplary configurations for each of distraction classification training device 120 and distraction occurrence and type determination device 140. Those skilled in the art will recognize that components of the system of FIG. 1 configured for detecting and classifying a type of driver distraction may thus take the form of computer system 800 as reflected schematically in FIG. 3, though variations thereof may readily be implemented by persons skilled in the art as may be desirable for any particular installation. In each such case, one or more computer systems 800 may carry out the foregoing methods as computer code.

Computer system 800 includes a communications bus 802, or other communications infrastructure, which communicates data to other elements of computer system 800. For example, communications bus 802 may communicate data (e.g., text, graphics, video, other data) between bus 802 and an I/O interface 804, which may include a display, a data entry device such as a keyboard, touch screen, mouse, or the like, and any other peripheral devices capable of entering and/or viewing data as may be apparent to those skilled in the art. Further, computer system 800 includes processor 808 (which may, for example, serve as processor 122 of distraction classification training device 120 and/or processor 142 of distraction occurrence and type determination device 140), which may comprise a special purpose or a general purpose digital signal processor. Still further, computer system 800 includes a memory 810 (which may, for example, serve as memory 124 of distraction classification training device 120 and/or memory 144 of distraction occurrence and type determination device 140), which may include primary memory 810(a), which may include by way of non-limiting example random access memory ("RAM"), read-only memory ("ROM"), one or more mass storage devices, or any combination of tangible, non-transitory memory. Still further, memory 810 of computer system 800 includes a secondary memory 810(b), which may comprise a hard disk, a removable data storage unit, or any combination of tangible, non-transitory memory. Finally, computer system 800 may include communications module 806 (which may, for example, serve as communications interface 128 of distraction classification training device 120 and/or communications interface 148 of distraction occurrence and type determination device 140), such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of primary memory 810(a), secondary memory 810(b), communications module 806, and combinations of the foregoing may function as a computer usable storage medium or computer readable storage medium to store and/or access computer software including computer instructions. For example, computer programs or other instructions may be loaded into the computer system 800 such as through a removable data storage device (e.g., a floppy disk, ZIP disks, magnetic tape, portable flash drive, optical disk such as a CD, DVD, or Blu-ray disk, Micro Electro-Mechanical Systems ("MEMS"), and the like). Thus, computer software including computer instructions may be transferred from, e.g., a removable storage or hard disc to secondary memory 810(b), or through data communication bus 802 to primary memory 810(a).

Communication module 806 allows software, instructions and data to be transferred between the computer system 800 and external devices or external networks, such as driving simulator system 150, memory 130 storing profiles of driver vehicle performance and road type data that are indicative of particular driver distractions, vehicle sensor systems 200, and monitoring entity computers 300. Software, instructions, and/or data transferred by the communication module 806 are typically in the form of signals that may be electronic, electromagnetic, optical or other signals capable of being sent and received by communication module 806. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow the processor 808 of computer system 800 to implement the methods discussed herein for detecting and classifying a type of driver distraction as illustrated in FIG. 1, according to computer software including instructions.

Computer system 800 may perform any one of, or any combination of, the steps of any of the methods described herein. It is also contemplated that the methods according to the present invention may be performed automatically or may be accomplished by some form of manual intervention.

The computer system 800 of FIG. 3 is provided only for purposes of illustration, such that the invention is not limited to this specific embodiment. Persons having ordinary skill in the art are capable of programming and implementing the instant invention using any computer system.

Further, computer system 800 may, in certain implementations, comprise a handheld device and may include any small-sized computing device, including by way of non-limiting example a cellular telephone, a smartphone or other smart handheld computing device, a personal digital assistant, a laptop or notebook computer, a tablet computer, a hand-held console, an MP3 player, or other similarly configured small-size, portable computing device as may occur to those skilled in the art.

The system of FIG. 1 may, in an exemplary configuration, likewise be implemented in a cloud computing environment for carrying out the methods described herein. That cloud computing environment uses the resources from various networks as a collective virtual computer, where the services and applications can run independently from a particular computer or server configuration making hardware less important. The cloud computer environment includes at least one user computing device. The client computer may be any device that may be used to access a distributed computing environment to perform the methods disclosed herein and may include (by way of non-limiting example) a desktop computer, a portable computer, a mobile phone, a personal digital assistant, a tablet computer, or any similarly configured computing device.

A client computer preferably includes memory such as RAM, ROM, one or more mass storage devices, or any combination of the foregoing. The memory functions as a computer readable storage medium to store and/or access computer software and/or instructions.

A client computer also preferably includes a communications interface, such as a modem, a network interface (e.g., an Ethernet card), a communications port, a PCMCIA slot and card, wired or wireless systems, and the like. The communications interface allows communication through transferred signals between the client computer and external devices including networks such as the Internet and a cloud data center. Communication may be implemented using wireless or wired capability, including (by way of non-limiting example) cable, fiber optics, telephone line, cellular telephone, radio waves or other communications channels as may occur to those skilled in the art.

Such client computer establishes communication with the one or more servers via, for example, the Internet, to in turn establish communication with one or more cloud data centers that implement one or more elements of the system of FIG. 1. A cloud data center may include one or more networks that are managed through a cloud management system. Each such network includes resource servers that permit access to a collection of computing resources and components of the system of FIG. 1, which computing resources and components can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. Another group of resource servers can host and serve applications to load on an instantiation of a virtual computer, such as an email client, a browser application, a messaging application, or other applications or software.

The cloud management system may comprise a dedicated or centralized server and/or other software, hardware, and network tools to communicate with one or more networks, such as the Internet or other public or private network, and their associated sets of resource servers. The cloud management system may be configured to query and identify the computing resources and components managed by the set of resource servers needed and available for use in the cloud data center. More particularly, the cloud management system may be configured to identify the hardware resources and components such as type and amount of processing power, type and amount of memory, type and amount of storage, type and amount of network bandwidth and the like, of the set of resource servers needed and available for use in the cloud data center. The cloud management system can also be configured to identify the software resources and components, such as type of operating system, application programs, etc., of the set of resource servers needed and available for use in the cloud data center.

In accordance with still further aspects of an embodiment of the invention, a computer program product may be provided to provide software to the cloud computing environment. Computer products store software on any computer useable medium, known now or in the future. Such software, when executed, may implement the methods according to certain embodiments of the invention. By way of non-limiting example, such computer usable mediums may include primary storage devices (e.g., any type of random access memory), secondary storage devices (e.g., hard drives, floppy disks, CD ROMS, ZIP disks, tapes, magnetic storage devices, optical storage devices, MEMS, nanotech storage devices, etc.), and communication mediums (e.g., wired and wireless communications networks, local area networks, wide area networks, intranets, etc.). Those skilled in the art will recognize that the embodiments described herein may be implemented using software, hardware, firmware, or combinations thereof. The cloud computing environment described above is provided only for purposes of illustration and does not limit the invention to this specific embodiment. It will be appreciated that those skilled in the art are readily able to program and implement the invention using any computer system or network architecture.

Systems and methods configured in accordance with at least certain aspects of the foregoing invention may optionally be provided as an aftermarket package that may receive vehicle information, such as vehicle speed, acceleration, braking, lateral distance, etc., and issue a warning (voice/audio, text/visual, combinations of the foregoing, etc.) to the driver when they are distracted. Further, the machine learning models described herein may be trained and/or revised over time based on the specific driver of a specific vehicle in which at least components of the foregoing system is used. Moreover, systems and methods configured in accordance with at least certain aspects of the invention may be integrated into Connected and Autonomous Vehicles (CAV) by manufacturers of such vehicles to, by way of non-limiting example, issue a warning to the driver and/or take over control of the vehicle (i.e., cause the vehicle to become autonomous) until the driver becomes attentive and takes back control of the vehicle.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A system for detecting and classifying a type of driver distraction, comprising:
    a driving simulator data capture device configured to acquire simulated driving behavior data profiles associated with a plurality of driving simulations in which a driving simulation operator engages at least one of a plurality of known driving distractions of a particular type at a known time or at a simulated location during each of the driving simulations;
    a distraction classification training device receiving said simulated driving behavior data profiles from the driving simulator data capture device;
    a distraction occurrence and type determination device; and
    a computer readable memory in data communication with said distraction classification training device and said distraction occurrence and type determination device;
    wherein said distraction classification training device includes a training processor executing computer instructions configured to:
        determine at said training processor a classification of each of said simulated driving behavior data profiles as one of a driving distraction event or a driving non-distraction event;
        upon classification of a first simulated driving behavior data profile as said driving distraction event, classify a type of distraction event for said first simulated driving behavior data profile; and
        store said classifications of each of said simulated driving behavior data profiles and one or more classifications of types of distraction events in said computer readable memory; and wherein said distraction occurrence and type determination device includes an application processor executing additional computer instructions configured to:
  receive at said distraction occurrence and type determination device from a remote vehicle sensor system a live driving behavior data profile associated with said remote vehicle sensor system;
  compare said live driving behavior data profile to said classifications of each of said simulated driving behavior data profiles in said computer readable memory;
  determine at said application processor a classification of said live driving behavior data profile as one of a live driving distraction event or a live driving non-distraction event, wherein said live driving distraction event is determined by transforming driver performance data in said live driving behavior data profile on a second-by-second basis and between two successive seconds to rate-of-change variables to capture sudden changes in driving behaviour; and
  upon determining said classification of said live driving behavior data profile as said live driving distraction event, determine a type of distraction event from said one or more classifications of types of distraction events for said live driving behavior data profile by identifying at least one of said sudden changes in said driving behavior.

2. The system of claim 1, wherein said additional computer instructions executed by said application processor are further configured to communicate to said remote vehicle sensor system an instruction to initiate a countermeasure to interrupt said live driving distraction event.

3. The system of claim 2, wherein said countermeasure is selected based upon said classification of a type of distraction event for said live driving behavior data profile.

4. The system of claim 1, wherein said computer instructions configured to determine at said training processor a classification of each of said simulated driving behavior data profiles as one of a driving distraction event or a driving non-distraction event and a type of distraction event are further configured to use a machine learning process selected from a group consisting of Support Vector Machine, Random Forest, and Adaptive Boosting.

5. The system of claim 1, wherein each simulated driving behavior data profile comprises a vehicle behavior selected from the group consisting of vehicle lane changes, vehicle speed, vehicle braking, vehicle throttle usage, and vehicle steering.

6. The system of claim 5, wherein each simulated driving behavior data profile further comprises a road type selected from the group consisting of rural connectors, freeways, urban arterials, and local roads.

7. The system of claim 1, wherein each of the known driving distractions of a particular type is selected from the group consisting of reading or sending a text message while driving, issuing a voice command to a mobile device while driving, engaging in a hand-held telephone call while driving, engaging in a hands-free telephone call while driving, eating and/or drinking while driving, and changing clothes while driving.

8. The system of 1, wherein said additional computer instructions executed by said application processor are further configured to communicate to a remote monitoring entity computer an occurrence of said live driving distraction event.

9. A method for detecting and classifying a type of driver distraction, comprising:
  acquiring simulated driving behavior data profiles from a driving simulator data capture device, wherein each of said simulated driving behavior data profiles is associated with a driving simulation in which a driving simulation operator engages at least one of a plurality of known driving distractions of a particular type at a known time or at a simulated location during the driving simulation;
  receiving at a distraction classification training device said simulated driving behavior data profiles from the driving simulator data capture device;
  determining at said distraction classification training device a classification of each of said simulated driving behavior data profiles as one of a driving distraction event or a driving non-distraction event;
  upon classification of a first simulated driving behavior data profile as said driving distraction event, classifying at said distraction classification training device a type of distraction event for said first simulated driving behavior data profile;
  storing said classifications of each of said simulated driving behavior data profiles and one or more classifications of types of distraction events in a computer readable memory in data communication with said distraction classification training device;
  receiving at a distraction occurrence and type determination device from a remote vehicle sensor system a live driving behavior data profile associated with said remote vehicle sensor system, wherein said distraction occurrence and type determination device is in data communication with said computer readable memory;
  comparing at said distraction occurrence and type determination device said live driving behavior data profile to said classification of each of said simulated driving behavior data profiles in said computer readable memory;
  determining at said distraction occurrence and type determination device a classification of said live driving behavior data profile as one of a live driving distraction event or a live driving non-distraction event, wherein said live driving distraction event is determined by transforming driver performance data in said live driving behavior data profile on a second-by-second basis and between two successive seconds to rate-of-change variables to capture sudden changes in driving behavior; and
  upon determining said classification of said live driving behavior data profile as said live driving distraction event, determining at said distraction occurrence and type determination device a type of distraction event from said one or more classifications of types of distraction events for said live driving behavior data profile by identifying at least one of said sudden changes in said driving behavior.

10. The method of claim 9, further comprising communicating from said distraction occurrence and type determination device to said remote vehicle sensor system an instruction to initiate a countermeasure to interrupt said live driving distraction event.

11. The method of claim 10, wherein said countermeasure is selected based upon said classification of a type of distraction event for said live driving behavior data profile.

12. The method of claim 9, wherein said steps of determining at said distraction classification training device a classification of each of said simulated driving behavior data profiles as one of a driving distraction event or a driving non-distraction event and a type of distraction event further comprises using a machine learning process selected from a group consisting of Support Vector Machine, Random Forest, and Adaptive Boosting.

13. The method of claim 9, wherein each simulated driving behavior data profile comprises a vehicle behavior selected from the group consisting of vehicle lane changes, vehicle speed, vehicle braking, vehicle throttle usage, and vehicle steering.

14. The method of claim 13, wherein each simulated driving behavior data profile further comprises a road type selected from the group consisting of rural connectors, freeways, urban arterials, and local roads.

15. The method of claim 9, wherein each of the known driving distractions of a particular type is selected from the group consisting of reading or sending a text message while driving, issuing a voice command to a mobile device while driving, engaging in a hand-held telephone call while driving, engaging in a hands-free telephone call while driving, eating and/or drinking while driving, and changing clothes while driving.

16. The method of claim 9, further comprising the step of communicating from said distraction occurrence and type determination device an occurrence of said live driving distraction event to a remote monitoring entity computer.

17. A non-transitory computer-usable medium for detecting and classifying a type of driver distraction, said non-transitory computer-usable medium embodying a computer program code, said computer program code comprising computer executable instructions configured for:
  acquiring simulated driving behavior data profiles from a driving simulator data capture device, wherein each of said driving behavior data profiles is associated with a driving simulation in which a driving simulation operator engages at least one of a plurality of known driving distractions of a particular type at a known time or at a simulated location during the driving simulation;
  receiving at a distraction classification training device said simulated driving behavior data profiles from the driving simulator data capture device;
  determining at said distraction classification training device a classification of each of said simulated driving behavior data profile as one of a driving distraction event or a driving non-distraction event;
  upon classification of a first simulated driving behavior data profile as said driving distraction event, classifying at said distraction classification training device a type of distraction event for said first simulated driving behavior data profile;
  storing said classification of each of said simulated driving behavior data profiles and one or more classifications of types of distraction events in a computer readable memory in data communication with said distraction classification training device;
  receiving at a distraction occurrence and type determination device from a remote vehicle sensor system a live driving behavior data profile associated with said remote vehicle sensor system, wherein said distraction occurrence and type determination device is in data communication with said computer readable memory;
  comparing at said distraction occurrence and type determination device said live driving behavior data profile to said classification of each of said simulated driving behavior data profiles in said computer readable memory;
  determining at said distraction occurrence and type determination device a classification of said live driving behavior data profile as one of a live driving distraction event or a live driving non-distraction event, wherein said live driving distraction event is determined by transforming driver performance data in said live driving behavior data profile on a second-by-second basis and between two successive seconds to rate-of-change variables to capture sudden changes in driving behavior; and
  upon determining said classification of said live driving behavior data profile as said live driving distraction event, determining at said distraction occurrence and type determination device a type of distraction event from said one or more classifications of types of distraction events for said live driving behavior data profile by identifying at least one of said sudden changes in said driving behavior.

18. The non-transitory computer-usable medium of claim 17, said computer program code further comprising computer executable instructions configured for communicating from said distraction occurrence and type determination device to said remote vehicle sensor system an instruction to initiate a countermeasure to interrupt said live driving distraction event, wherein said countermeasure is selected based upon said classification of a type of distraction event for said live driving behavior data profile.

19. The non-transitory computer-usable medium of claim 17, wherein said computer executable instructions configured for determining at said distraction classification training device a classification of each of said simulated driving behavior data profiles as one of a driving distraction event or a driving non-distraction event and a type of distraction event are further configured to use a machine learning process selected from a group consisting of Support Vector Machine, Random Forest, and Adaptive Boosting.

20. The non-transitory computer-usable medium of claim 17, said computer program code further comprising computer executable instructions configured for communicating from said distraction occurrence and type determination device an occurrence of said live driving distraction event to a remote monitoring entity computer.

* * * * *